United States Patent [19]

Kitagawa et al.

[11] Patent Number: 4,512,189
[45] Date of Patent: Apr. 23, 1985

[54] LIQUID QUANTITY DETECTING DEVICE

[75] Inventors: Junji Kitagawa; Shigeyuki Akita, both of Okazaki; Sotoo Kitamura, Aichi, all of Japan

[73] Assignee: Nippon Soken, Inc., Nishio, Japan

[21] Appl. No.: 403,481

[22] Filed: Jul. 30, 1982

[30] Foreign Application Priority Data

Aug. 1, 1981 [JP] Japan .................. 56-120027

[51] Int. Cl.³ .................................. G01F 23/00
[52] U.S. Cl. .................... 73/296; 73/862.64; 177/211
[58] Field of Search ............. 73/296, 862.64; 177/137, 211; 73/313; 364/567

[56] References Cited

U.S. PATENT DOCUMENTS

| | | | |
|---|---|---|---|
| 1,769,639 | 7/1930 | Gustafson | 73/296 X |
| 1,818,001 | 8/1931 | Moorhouse | 73/296 |
| 3,661,221 | 5/1972 | Barrett | 177/137 |
| 3,707,076 | 12/1972 | Jones | 73/862.64 X |
| 4,044,920 | 8/1970 | Swartzendruber | 73/862.65 X |
| 4,076,088 | 2/1978 | Gallo et al. | 177/177 X |
| 4,121,457 | 10/1978 | Yoshida et al. | 73/291 |
| 4,350,048 | 9/1982 | Kovacs | 73/862.65 X |
| 4,386,406 | 5/1983 | Igarashi et al. | 73/313 X |
| 4,407,160 | 10/1983 | van de Velde | 73/296 |
| 4,463,604 | 8/1984 | Kitagawa et al. | 177/211 X |

Primary Examiner—Daniel M. Yasich
Attorney, Agent, or Firm—Cushman, Darby & Cushman

[57] ABSTRACT

A liquid quantity detecting device includes a float-type liquid-quantity meter and a torsion bar-type liquid meter. In the float-type liquid-quantity meter, the liquid quantity is detected by a float in a tank and the position of the float is converted to an electric signal by a variable resistor. The torsion bar-type liquid meter includes housings fixed to the tank, torsion bars, one end of each being fixed to the tank by the housings and the other end of each being fixed to a supporting member so that the torsion bars are twisted by weight of the tank, twisted angle detection means for detecting the twisted angle of the torsion bars, and an electrical processor for supplying a signal corresponding to the quantity of liquid in the tank after receiving a signal from the twisted angle detector. When the liquid quantity in the tank is larger than a predetermined quantity, the liquid quantity, for example, the quantity of gasoline in a gasoline tank, is measured by the floating-type liquid-quantity meter. When the liquid quantity in the tank is smaller than a predetermined quantity, the liquid quantity is displayed precisely and accurately by the torsion bar-type liquid meter.

6 Claims, 14 Drawing Figures

LIQUID QUANTITY DETECTING DEVICE

BACKGROUND OF THE INVENTION

1. Field of the Invention

The present invention relates to a liquid quantity detecting device for detecting the quantity of liquid stored in a predetermined tank.

2. Description of the Prior Art

Previously, as a conventional liquid quantity detecting device, a device having a float which floats on the liquid has usually been used. In this device, the quantity of liquid is detected on the basis of the change of resistance between one end of a resistor and a movable contact sliding thereon. The contact is fixed to the float and moves on the resistor in accordance with the movement of the float. However, in this device, the quantity of liquid is detected on the basis of the liquid level, and, therefore, the quantity of liquid cannot be detected precisely because of the difference between the form of the tank in which the liquid is stored and the form of the surface of the resistor, and because of the difference of the resistance value due to the contact area between the contact and the surface of the resistor. Particularly when the liquid decreases to a small quantity the measurement error is large. Therefore, the present invention is proposed in order to improve the above-mentioned inaccuracy in measurement.

SUMMARY OF THE INVENTION

An object of the present invention is to provide a liquid quantity detecting device in which, when the quantity of liquid is large, the prior art liquid quantity detecting device is used, and when the liquid is less than a predetermined amount, a device for detecting and displaying the quantity of liquid on the basis of the weight of the liquid to be measured is used, whereby when the liquid decreases to a small quantity, the quantity can be detected and displayed precisely.

Another object of the present invention is to provide a liquid quantity detecting device in which, when the quantity of the liquid is large, the prior art liquid quantity detecting device, which detects the quantity of liquid by a combination of the sliding contact fixed to the float and the resistor and displays the quantity of liquid with a needle, is used, and when the liquid decreases to a small quantity, torsion is generated between a housing and torsion bars due to the weight of the tank in which the liquid to be measured is stored The tank is directly linked to the housing, a twisted angle detector is located on the housing and the stationary portion of the torsion bars is fixed. The twisted angle of the torsion bars is detected, and the weight of the liquid to be measured, namely the quantity of liquid, is precisely detected and is accurately displayed.

Still another object of the present invention is to provide a liquid quantity detecting device in which the twisted angle detector comprises a first coil in a housing supplied with a pulse voltage signal and a second coil located perpendicular to the first coil at a certain distance, said second coil being electrically linked to the first coil by inductance and mechanically linked to the first coil by the torsion bars. The positional relationship between the first coil and the second coil is changed by the mechanical linkage and, the degree of magnetic flux to the second coil is thereby changed. The position of the second coil (i.e., the twisted angle of the torsion bars) is determined by determining the change of the flux, and the weight of the liquid, (i.e., the quantity of liquid) can be detected precisely and displayed accurately even when the liquid decreases to a small quantity.

Still another object of the present invention is to provide a liquid quantity detecting device in which the twisted angle detector comprises a first and a second electrode, whereby the twisted angle of the torsion bars is determined according to change of electrostatic capacities between the first and second electrodes and the quantity of liquid can be detected precisely and displayed accurately even when the liquid decreases to a small quantity.

Still another object of the present invention is to provide a liquid quantity detecting device in which the quantity of liquid is detected on the basis of weight instead of volume so that it is more precisely detected and more accurately displayed due to the fact that the effect of the coefficient of volume expansion is eliminated when the liquid decreases to a small quantity.

DESCRIPTION OF THE PREFERRED EMBODIMENTS

Figure 1A:
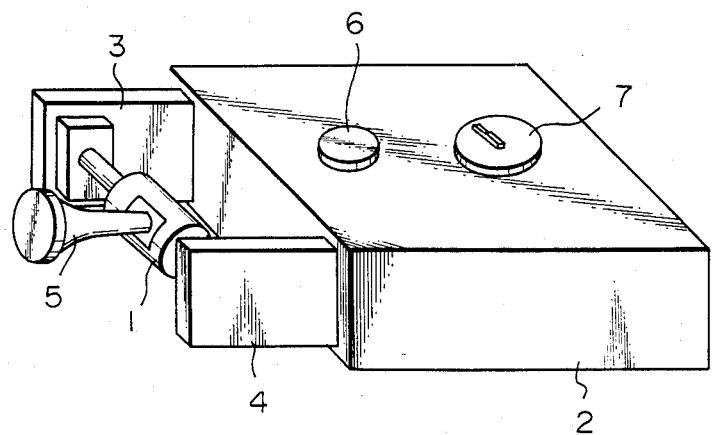
FIG. 1A shows a perspective view of a liquid quantity detecting device according to an embodiment of the present invention.
Figure 1B:
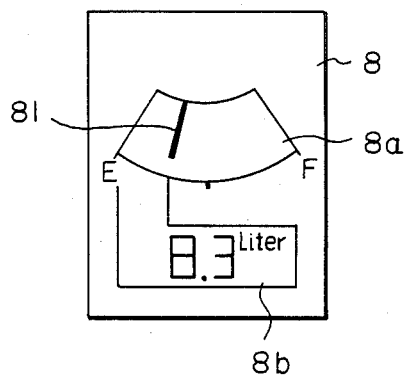
FIG. 1B shows an elevational view of a display in the device in FIG. 1A.
Figure 1C:
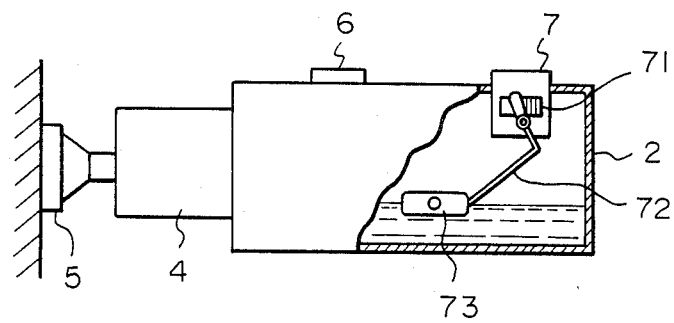
FIG. 1C shows a partial sectional view of the device in FIG. 1A.

A liquid quantity detecting device according to an embodiment of the present invention will be explained below with reference to FIGS. 1A through 7. In FIG. 1A, a liquid meter 1, which detects the twisted angle of the torsion bars due to the weight of a tank, which stores the liquid to be measured, and includes electrical circuits which generate a pulse width signal proportional to the twisted angle (i.e., the quantity of liquid to be measured), is fixed to the tank 2 at both ends with stays 3 and 4 and is attached to a supporting member (not shown) by an arm 5. In addition, FIG. 1A shows a mouth 6, through which liquid flows in and out, and a conventional float-type liquid-quantity meter 7. In FIG. 1B is shown a display 8 consisting of a conventional pointer-type indicator 8a and an indicator 8b which displays the quantity of liquid precisely and digitally when the quantity of liquid is less than a predetermined quantity. The indicator 8a is a known bimetal-type meter having a pointer 81, and the indicator 8b is a digital display meter using, for example, a liquid crystal display, a fluorescent display tube, or the like. The float-type liquid-quantity meter 7 consists of a float 73, a float arm 72, and a potentiometer 71 as shown in FIG. 1C.

Figure 2:
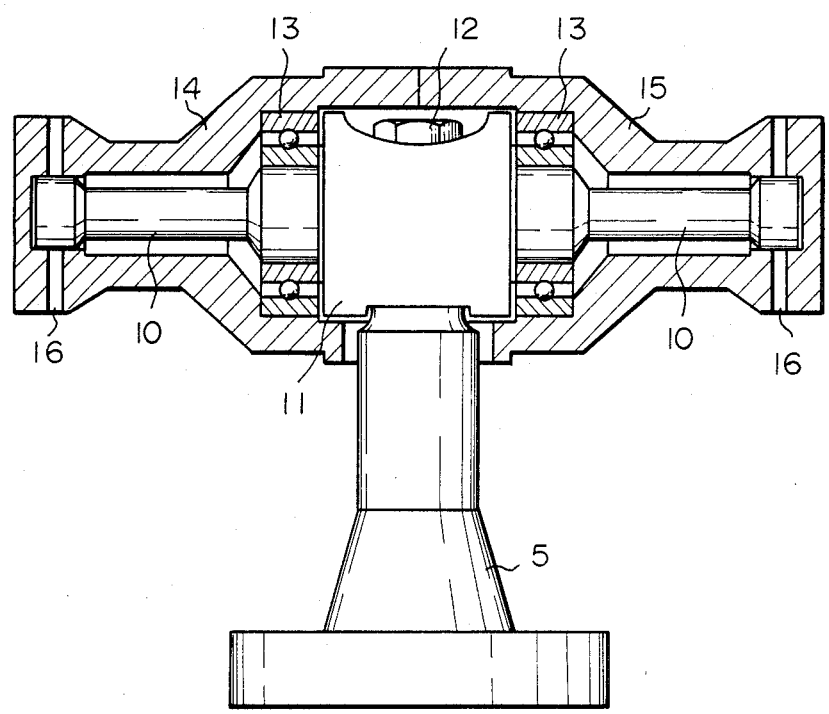
FIG. 2 shows a partial sectional view of the device in FIG. 1A.

In FIG. 2, one end of the arm 5 is fixed to a stationary portin 11 of torsion bars 10 with a nut 12, and at the other end of the arm 5 a tapped hole (not shown) is provided so that the arm can be attached to the supporting member. The torsion bars 10 are pressed into housings 14 and 15, respectively, with two bearings 13 and are fixed to the housings with two knock pins 16.

Figure 3:
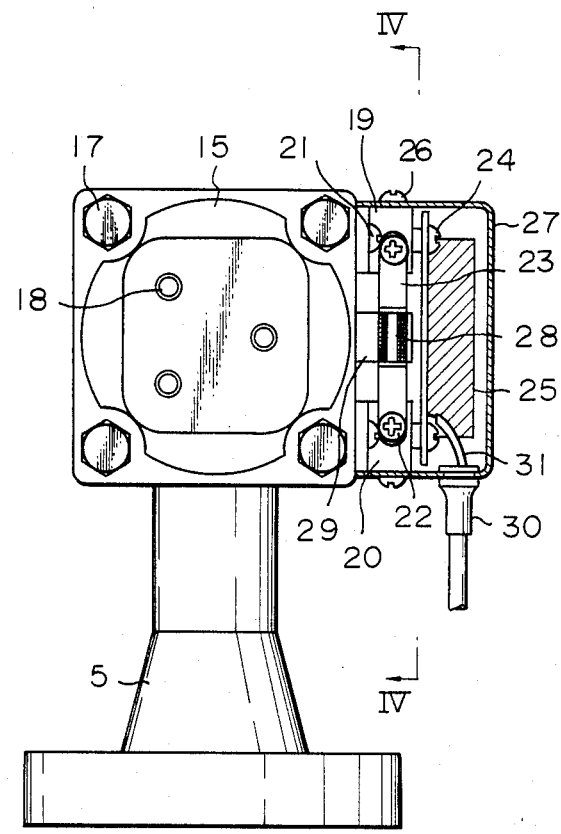
FIG. 3 shows a partial sectional view of a side of the device in FIG. 2.

In FIG. 3, the housing 15 is fixed to the housing 14 with four bolts 17, and the housings each have three tapped holes 18 so that they can be attached to the stays 3 and 4 in FIG. 1A, respectively. Stands 19 and 20 are fixed to housings 14 and 15 with four bolts 21, respectively. A first bobbin 23 is fixed to the stands with two bolts 22, an electric processor 25 is fixed to the stands with two bolts 24, and a cover 27 is fixed to the stands with two bolts 26. In addition to the above-mentioned elements, FIG. 3 shows a first coil 28 which is wound around the first bobbin 23, a coilstand 29 which will be explained later, and a cord bushing 30 which is attached to a cover 27 to protect outgoing electric lines 31.

Figure 4:
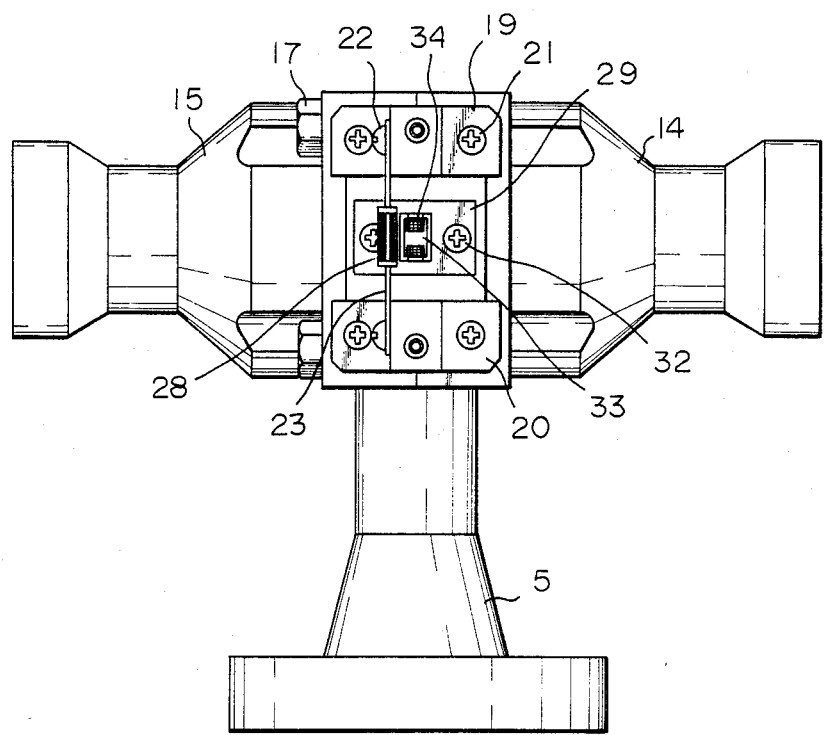
FIG. 4 shows a sectional view taken along line IV—IV in the device of FIG. 3.

In FIG. 4, the above-mentioned coilstand 29 is fixed to the stationary portion 11 of the torsion bars 10 with two bolts 32, and a second bobbin 33, which has a ferrite core (not shown), is attached to and fixed to the coilstand 29. A second coil 34 is wound around the second bobbin 33. The first coil 28 is wound around the first bobbin 23. If the housings 14 and 15 are twisted with reference to the stationary portion of the torsion bars (i.e., the arm 5) more than a predetermined angle through the torsion bars 10, the housings 14 and 15 contact the arm 5, and after such contact the housings 14 and 15 are no longer twisted. Thus, the opening through which arm 5 engages meter 1 (FIG. 1A) provides a physical limit to the twisting action of the torsion bars. The quantity of liquid at that time (i.e., point of maximum twist) is determined so as to be a predetermined quantity. The conventional pointer-type indicator 8a is not explained in detail since it is publicly known.

Figure 5A:
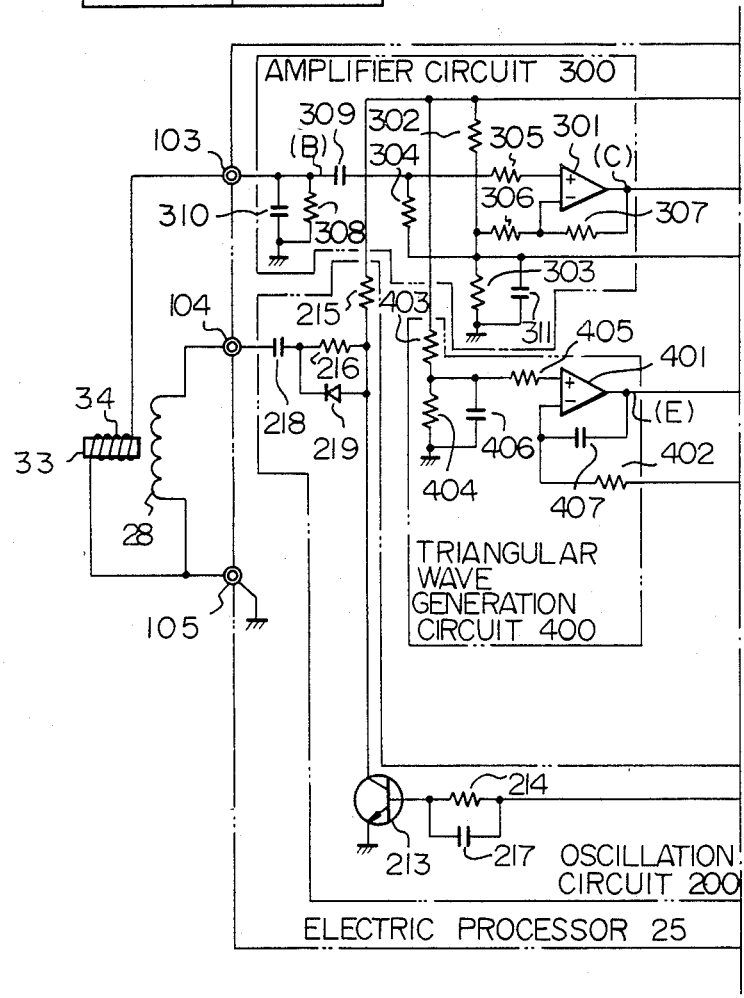
FIG. 5, A and B, shows an electrical circuit diagram of the device according to the embodiment of the present invention.
Figure 5B:
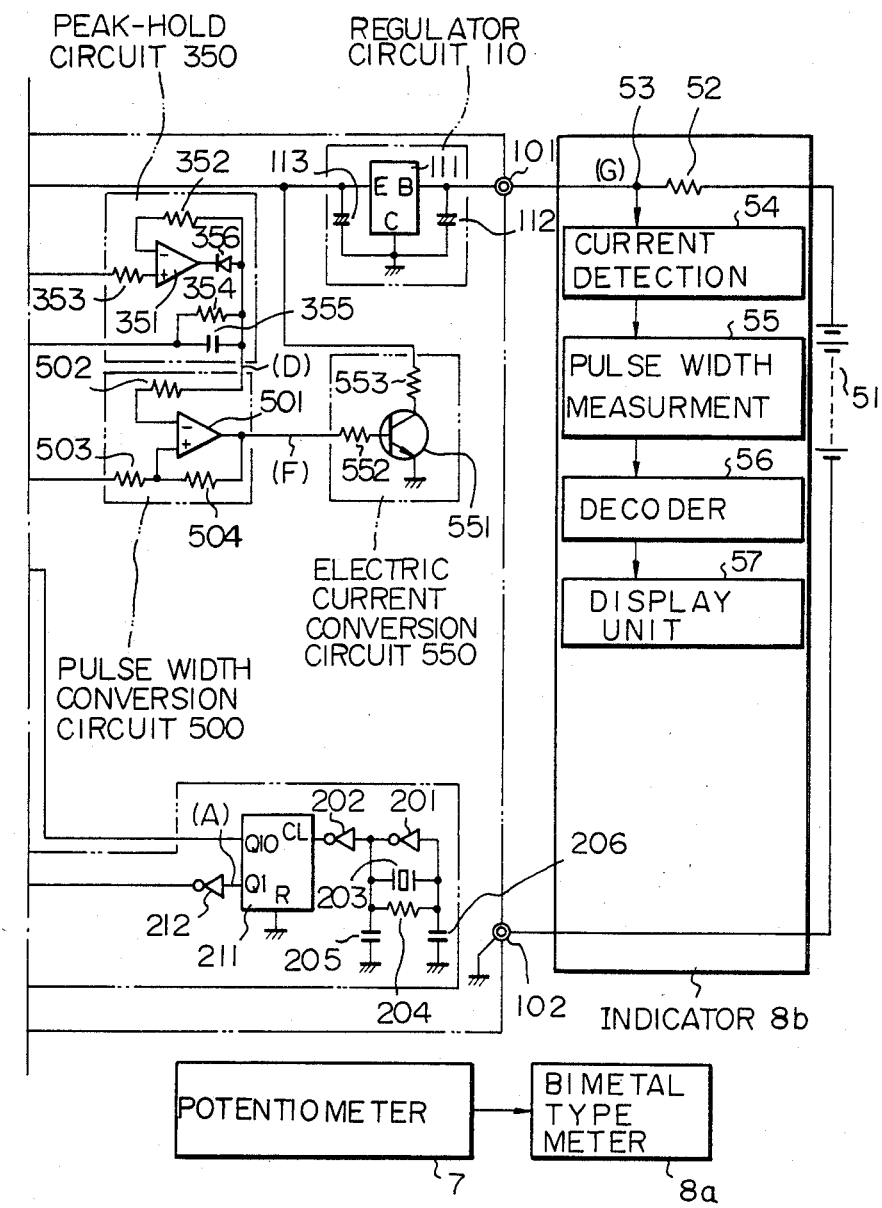
Figure 6:
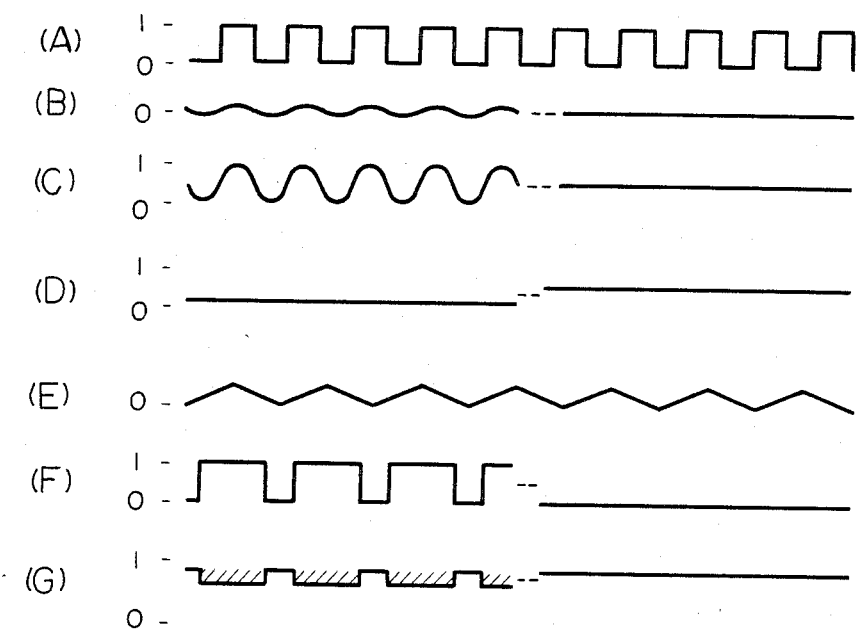
FIG. 6 shows a waveform diagram illustrating the operation of the circuit in FIG. 5.

Reference symbols (A) to (G) in FIG. 5 correspond to those of the waveform diagram in FIG. 6. In FIG. 5, a battery 51 supplies electric power to the indicator 8b and the electric processor 25. The electric current-detecting resistor 52 is located in the indicator 8b. The indicator 8b includes an electric current-detection circuit 54 for generating pulses having a pulse width corresponding to the voltage of a point 53(G), a pulse width measurement circuit 55 for converting the pulse width to the binary signal, a decoder 56 for decoding the binary signal, and a liquid display unit 57 for displaying the digital value in response to the signal from the decoder 57. The decoder 56 is a known device which makes the display of the display unit blank if the binary signal from the pulse width measurement circuit 55 overflows a predetermined value, for example, if the fifth column changes from "0" to "1". Accordingly, if the liquid exceeds the predetermined quantity, the display unit 57 changes the display thereof to blank. A power source terminal 101 is connected to the battery 51 through the electric current-detecting resistor 52, and a ground terminal 102 is connected to a ground terminal of the battery 51.

A terminal 103 is connected to one terminal of the second coil 34 wound around the second bobbin 33 in FIG. 4, and the other terminal of the second coil 34 is connected to a terminal 105. A terminal 104 is connected to one terminal of the first coil 28 wound around the first bobbin 23 in FIG. 4, and the other terminal of the first coil 28 is connected to the terminal 105.

A regulator circuit 110 consists of a regulator 111 (for example, Model No. NC 7806 made by Motorola) and capacitors 112 and 113 and supplies a constant output voltage.

An oscillation circuit 200 consists of an oscillator, a binary counter 211 (for example, Model No. TC 4020 made by Toshiba), an inverse gate 212, a transistor 213, resistors 214, 215, and 216, capacitors 217 and 218, and a diode 219. The oscillator consists of inverse gates 201 and 202, a ceramic vibrator 203, a resistor 204, and capacitors 205 and 206. The oscillation circuit 200 supplies a square wave to the first coil 28 through the terminal 104.

An amplifier circuit 300 includes an operational amplifier 301, resistors 302, 303, 304, 305, 306, 307, and 308, and capacitors 309, 310, and 311 and amplifies a signal generated across the second coil 34. A peak-hold circuit 350 includes an operational amplifier 351, resistors 352, 353, and 354, a capacitor 355, and a diode 356. The peak-hold circuit 350 holds the negative peak voltage of the output signal from an amplifier circuit 300.

A triangular wave-generating circuit 400 includes an operational amplifier 401, resistors 402, 403, 404, and 405, and capacitors 406 and 407 and generates a trianglar wave.

A pulse width conversion circuit 500 consists of an operational amplifier 501 and resistors 502, 503, and 504 and generates a pulse width signal having a pulse width proportional to the voltage generated by the peak-hold circuit 350.

An electric current value conversion circuit 550 consists of a transistor 551 and resistors 552 and 553 and converts the output signal of the pulse width conversion circuit 500 to the amplitude of the electric current. Thus, the displacement of the second coil 34 with reference to the first coil 28 is transmitted to the terminal 101 as the change of electric current value and is detected at a terminal 53 of the electric current-detecting resistor 52 in the indicator 8b as a voltage change.

The operation of the above-mentioned device is explained below. If the liquid to be measured in the tank 2 of FIG. 1A is more than a predetermined quantity, the housings 14 and 15 fixed to the stays 3 and 4 contact the arm 5 attached to the supporting member (not shown) and the torsion bars 10 are in a maximal twisted state. In this state, the quantity of liquid is detected and displayed by the conventional float-type liquid-quantity meter 7 and the conventional pointer-type indicator 8a. Since a conventional device is used, a detailed explanation of this state is not given.

When the quantity of liquid is large, the approximate quantity is preferably determined, and when the quantity of liquid is small, the exact quantity is preferably determined. Therefore, in order not to enlarge the displacement of the torsion bars and in order to measure the quantity of liquid more precisely, when there is only a small quantity of liquid, it is preferred that the torsion bars be used to precisely measure the quantity of liquid, and when the quantity of liquid is large, it is preferred that the float-type liquid-quantity meter be used to measure the quantity of liquid. However, it is preferable that both types of liquid meters be used together.

Figure 7A:
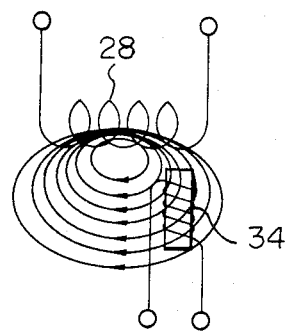
FIGS. 7A and 7B show explanatory views of the operation of the coils in FIG. 5.

A detailed explanation is given below of a case in which the liquid to be measured in the tank 2 of FIG. 1A is less than a predetermined quantity and the amount of torsion between the housings 14 and 14 fixed to the stays 3 and 4 and the arm 5 attached to the supporting member (not shown) by the torson bars 10 is small. At first, a pulse signal from the inverse gate 202 of the oscillation circuit 200 is supplied to the clock (CL) terminal of the binary counter 211. At an output terminal Q1 of the first stage of the binary counter 211, the pulse signal shown in FIG. 6(A) is generated. The pulse signal drives the transistor 213 through the inverse gate 212 and is supplied to the first coil 28 through the terminal 104. Since torsion occurs at the torsion bars 10, if the second coil 34 moves with reference to the first coil 28 as shown in FIG. 7A, the number of magnetic fluxes which are generated from the first coil 28 and are linked to the second coil 34 increases, a voltage signal which corresponds to the twisted angle of the torsion bar is generated across the second coil 34 as shown in FIG. 6(B), and the generated voltage signal is supplied to one terminal of the capacitor 309 of the amplifier circuit 300. On the other hand, the other terminal of the capacitor 309 is supplied with a reference voltage divided by the resistors 302 and 303 through the resistor 304. This other terminal of the capacitor 309 is connected to the non-inverting input terminal of the operational amplifier 301, and the inverting input terminal thereof is supplied with the reference voltage divided by the resistors 302 and 303. Therefore, the signal shown in FIG. 6(B) supplied to the capacitor 309 is amplified by the operational amplifier 301. The output waveform of the operational amplifier 301 is shown in FIG. 6(C).

The signal shown in FIG. 6(C) is supplied to the non-inverting input terminal of the operational amplifier 351 in the peak-hold circuit 350. The output signal is held at the negative peak voltage of the input signal shown in FIG. 6(C) and generates the waveform shown in FIG. 6(D) since the negative peak voltage of the input signal shown in FIG. 6(C) is lower than the reference voltage divided by resistors 302 and 303.

The pulse signal generated at the output terminal Q10 of the tenth stage of the binary counter 211 in the oscillation circuit 200 is supplied to the inverting input terminal of the operational amplifier 401 through the resistor 402 in the triangular wave-generating circuit 400. The output signal of the operational amplifier 401 forms a triangular wave determined by the time constant due to the resistor 402 and the capacitor 407, as shown in FIG. 6(E). The output signal is supplied to the non-inverting input terminal of the operational amplifier 501 in the pulse width conversion circuit 500, the signal shown in FIG. 6(D) is supplied to the inverting input terminal of the operational amplifier 501, the signal shown in FIG. 6(E) is compared with the signal shown in FIG. 6(D), and the signal shown in FIG. 6(F) is generated by the output terminal of the operational amplifier.

The signal shown in FIG. 6(F) is supplied to the electric current value conversion circuit 550, the transistor 551 is switched on and off, and the battery supplies electric current to the transistor 551 through the regulator circuit 110. As a result, the signal shown in FIG. 6(G) is generated at the terminal 53 of the electric current detection resistor 52 in the indicator 8b, namely, superposed on the power source line, the width of the signal corresponding to the twisted angle of the torsion bar 10 and the polarity being from a certain voltage to the level of logic "0". The pulse width is converted to the digital value in the indicator 8b, and the indicator 8b precisely indicates the quantity of liquid digitally.

Figure 7B:
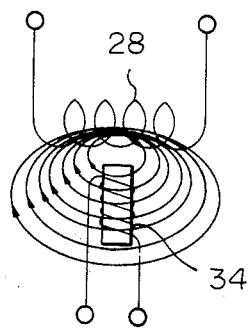

If there is no liquid to be measured in the tank 2 of FIG. 1A, the housings 14 and 15 fixed to the stays 3 and 4 are not twisted with reference to the arm 5 attached to the supporting member (not shown) and the second coil 34 is positioned at the center of the first coil 28 as shown in FIG. 7B. Accordingly, in the case of the magnetic flux which is generated by the first coil 28 and is linked to the second coil 34, the portion of the flux which is perpendicularly linked to the second coil 34 does not exist, and the output of the second coil 34 is logic "0" as shown in the right portion of FIG. 6(B). Thus the output of the amplifier circuit 300 becomes the same level as the reference voltage divided by the resistors 302 and 303 as shown in FIG. 6(C). The output voltage of the peak-hold circuit 350 becomes the same as the voltage shown in FIG. 6(C) (this voltage is shown in FIG. 6(D)) and the output of the pulse width conversion circuit 500 becomes logic "0" as shown in FIG. 6(F). The signal shown in FIG. 6(F) is supplied to the electric current value conversion circuit 550, as mentioned above, a certain voltage is generated at the terminal 53 of the electric current detection resistor 52 as shown in FIG. 6(G), a signal which indicates that no torsion exists in the torsion bars is obtained from the above-mentioned certain voltage and is operated in the indicator 8b, and the quantity of liquid to be measured is digitally displayed as zero.

In the above-mentioned embodiment, a ceramic vibrator is used as the oscillator in the oscillation circuit 200. However, instead of a ceramic vibrator, an RC oscillation circuit or a quartz crystal oscillator may be used. At a peak-hold circuit 350, a negative peak voltage is detected. However, a positive peak voltage may be detected instead. A pulse width signal proportional to the output voltage of the peak-hold circuit 350 is obtained by using the triangular wave from the triangular wave-generating circuit 400. Instead of the triangular wave, a sawtooth wave may be used. Although a pulse signal is supplied to the first coil 28, a sinusoidal wave may be supplied instead.

Figure 8:
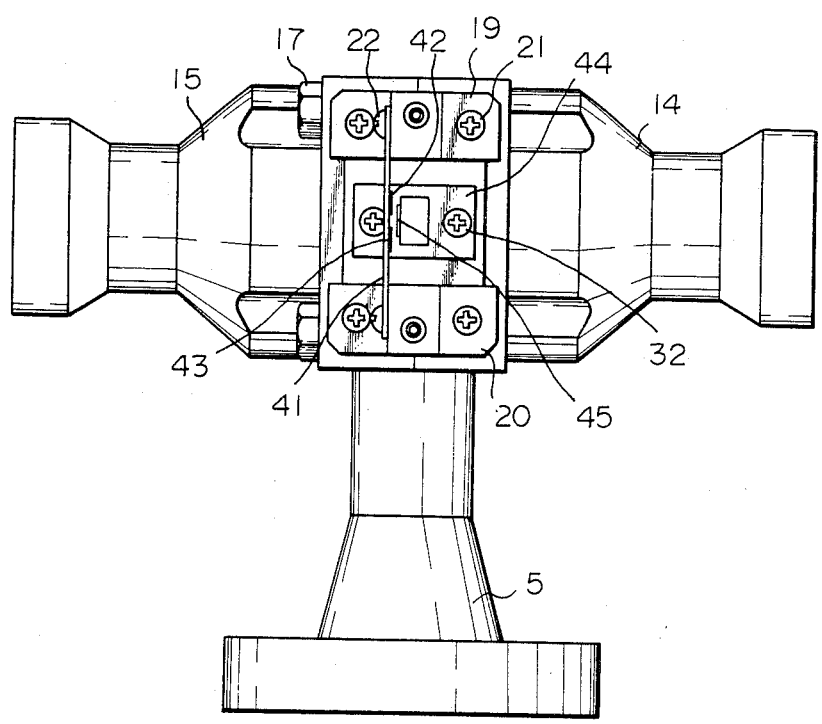
FIG. 8 shows a partial sectional view of the device according to another embodiment of the present invention.
Figure 9A:
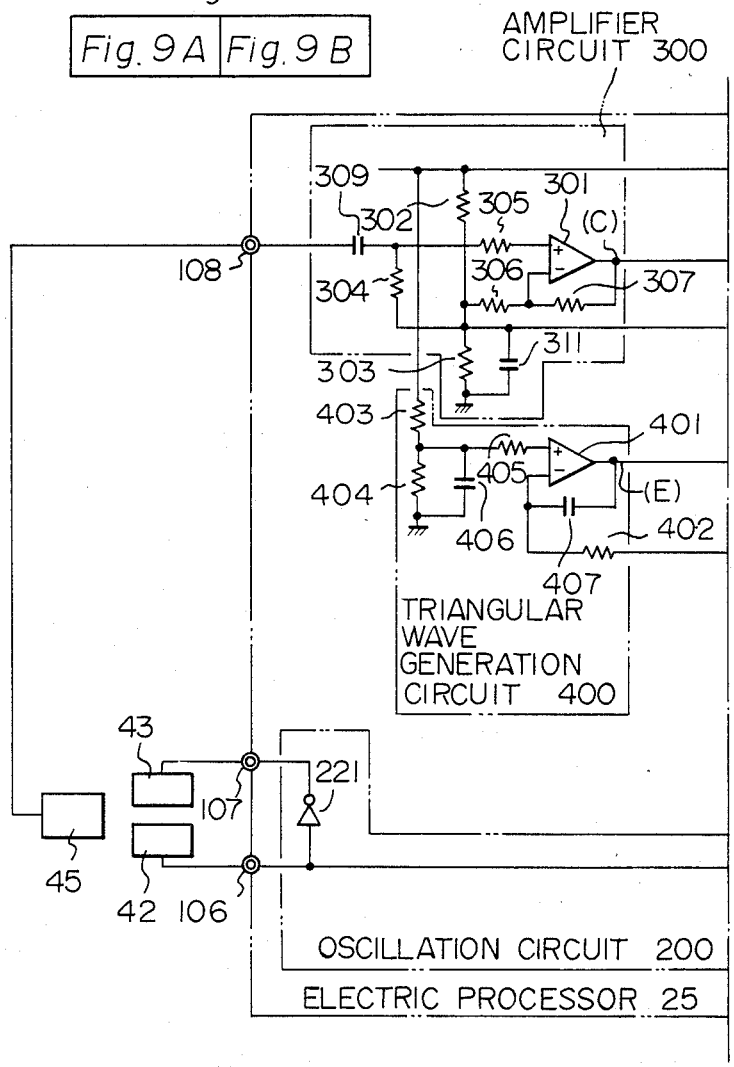
FIG. 9, A and B, shows an electrical circuit diagram of the device in FIG. 8.
Figure 9B:
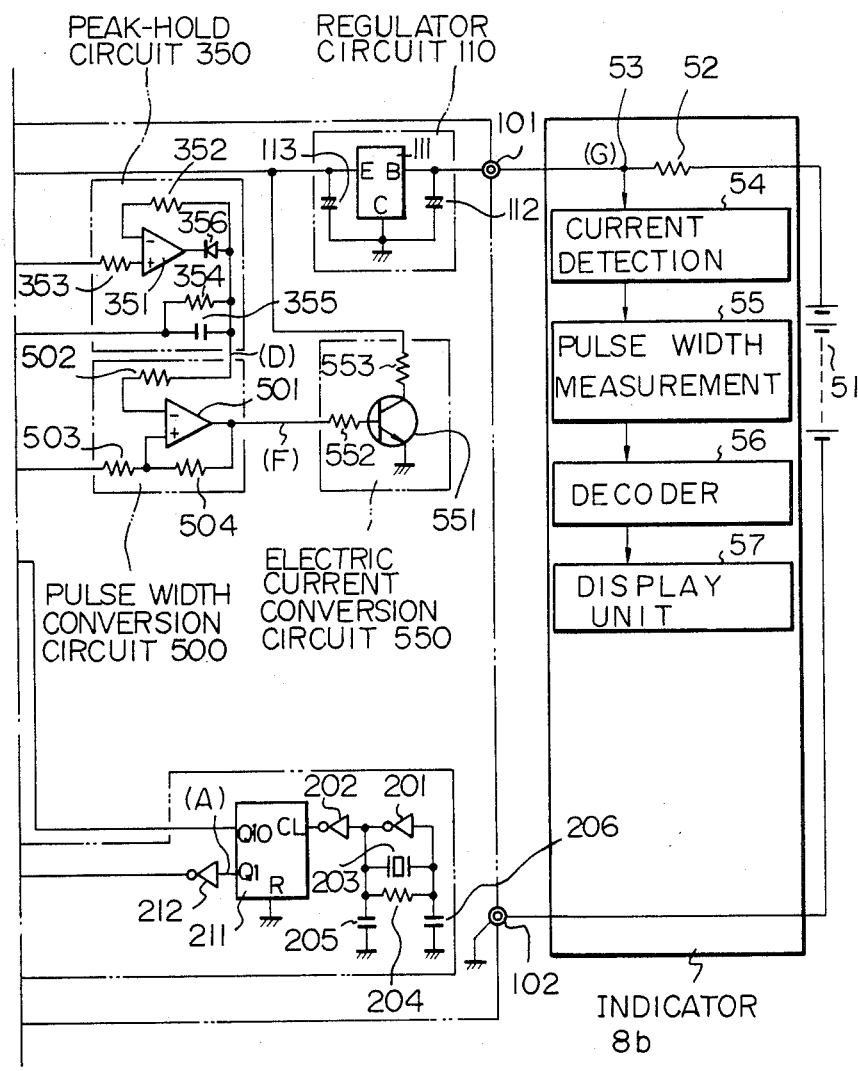

Another embodiment of the present invention will be explained below with reference to FIG. 8. A plate 41 having a first (a) electrode 42 and a first (b) electrode 43 is fixed to the stands 19 and 20 with the two bolts 22. An electrode stand 44 having a second electrode 45 is fixed to the stationary portion 11 of the torsion bars 10 with the two bolts 32, and an electrostatic capacity between the first (a) electrode 42 and the second electrode 45 and another electrostatic capacity between the first (b) electrode 43 and the second electrode 45 are created. The elements in FIG. 8 which are identical to those in FIG. 4 are referred to by the same reference numerals as in FIG. 4. An electrical circuit diagram of the device according to the embodiment in FIG. 8 is shown in FIG. 9. In FIG. 9, the output of the inverse gate 212 in the oscillation circuit 200 is supplied to the first (a) electrode 42 through a terminal 106 and the inverted output of an inverse gate 221 is supplied to the first (b) electrode 43 through a terminal 107. The second electrode 45 is connected to one terminal of the capacitor 309 through a terminal 108. The constitution of the circuit of FIG. 9, except for the above-mentioned portion, is the same as that of the circuit of FIG. 5.

The operation of the circuit in FIG. 9 will be explained below. If the torsion bars 10 are not twisted, the second electrode 45 is positioned the same distance from the first (a) electrode 42 as from the first (b) electrode 43. Therefore, the electrostatic capacity between the first (a) electrode 42 and the second electrode 45 is the same as the electrostatic capacity between the first (b) electrode 43 and the second electrode 45. Further, since a pulse voltage signal having an inverted phase with reference to the phase of the pulse voltage signal supplied to the first (a) electrode 42 is supplied to the first (b) electrode 43, the signal generated at the second electrode 45 is in an intermediate potential and is supplied to the capacitor 309 through the terminal 108. Except for these operations, a detailed explanation of the embodiment is not given here. If the torsion bars 10 are twisted and the second electrode 45 approaches the first (a) electrode 42, the electrostatic capacity between the first (a) electrode 42 and the second electrode 45 is greater than the electrostatic capacity between the first (b) electrode 43 and the second electrode 45, and the pulse voltage signal from the inverse gate 212, which pulse voltage signal is proportional to the difference of the above-mentioned capacities, is conducted to the second electrode 45 and is supplied to one terminal of the capacitor 309 through the terminal 108. Except for these operations, a detailed explanation of the embodiment is not given here.

We claim:

1. A liquid quantity detecting device for detecting the liquid quantity in a tank, comprising:
   (a) a float-type liquid-quantity meter having a float provided in said tank, means for generating an electric signal corresponding to the position of said float, and first display means for displaying the liquid quantity in response to the signal from said generating means, said float-type liquid-quantity meter detecting and displaying the quantity of liquid stored in said tank when said quantity is larger than a predetermined quantity; and
   (b) a liquid meter comprising,
      (i) housings fixed to said tank;
      (ii) at least two torsion bar means, one end of each means being fixed to said tank by said housings and the other end of each means being fixed to a supporting member, for twisting in proportion to the weight of said tank and said liquid in said tank;
      (iii) twisted angle detection means for detecting an angle of the twisting of said torsion bar means, and comprising first and second electric members which are adapted to move relative to each other in proportion to the twisted angle of said torsion bar means, and are arranged facing each other, said second electric member being positioned at the center of said first electric member whenever said twisting is at a predetermined status defined as zero;
      (iv) electrical processing means for generating a signal corresponding to the quantity of liquid in said tank in response to detections of said twisted angle detection means; and
      (v) second display means for displaying liquid quantity in response to said signal from said electrical processing means when the quantity of said liquid to be measured is smaller than said predetermined quantity.

2. A device as defined in claim 1, wherein said electrical processing means comprises:
   an oscillation circuit, a generated waveform of which has a certain period, for supplying a pulse voltage signal to said twisted angle detection means;
   an amplifier circuit for amplifying the detections of said twisted angle detection means; and
   a peak-hold circuit for detecting the peak of an output voltage from said amplifier circuit and for generating a direct current voltage corresponding to said angle of twisting of said torsion bar means.

3. A device as defined in claim 2, wherein said electrical processing means further comprises:
   a triangular wave-generating circuit for generating a triangular wave, having a certain period, after receiving the signal from said oscillation circuit,
   a pulse width conversion circuit for generating a signal having a pulse width proportional to the direct current voltage corresponding to said angle of twisting of said torson bar means when said pulse width conversion circuit receives the signal from said triangular wave generating circuit and the signal from said peak-hold circuit; and
   an electric current value conversion circuit for generating an output signal based on said pulse width conversion circuit and converting it to a change of the amplitude of the electric current,
   wherein the output signal of said electric current value conversion circuit is superposed on a power source line.

4. A device as defined in claim 1, wherein said first electric member comprises a first coil attached to said housings, said second electric member comprises a second coil attached to a stationary portion of said torsion bar means and located at a certain distance perpendicularly to said first coil, said second coil is inductively linked to said first coil and is mechanically linked to said first coil by said torsion bar means, and
   said twisted angle detection means includes means for detecting twisting of said torsion bar means from the value of a voltage signal inductively generated across said second coil by said first coil, said voltage signal corresponding to the degree if magnetic flux linkage of said second coil with said first coil when a pulse voltage from said electric processor is supplied to said first coil, wherein the degree of magnetic flux corresponds to the relative position of said first and second coils.

5. A device as defined in claim 1, wherein said first electric member comprises a first electrode which has a first (a) electrode and a first (b) electrode attached to said housing, said second electric member comprises a second electrode attached to a stationary portion of said torsion bar means and facing said first electrode at a certain distance, said second electrode being capacitively coupled with said first electrode and mechanically linked to said torsion bar means, and
   said twisted angle detection means includes means for detecting twisting of said torsion bar means from the value of a voltage signal capacitively generated by said second electrode coupling with said first electrode, the value of said voltage signal corresponding to the difference between the electrostatic capacity effected by said first (a) electrode and said second electrode and the electrostatic capacity effected by said first (b) electrode and said second electrode when pulse and inverting pulse voltages thereof from said electrical processing means are supplied to said first (a) and first (b) electrodes, respectively.

6. A liquid quantity detecting device for accurately detecting by weight the liquid quantity in a tank despite physical changes in the volume of said liquid due to expansion and contraction thereof, comprising:

(a) a fixed number;

(b) a torsion bar provided between said tank and said fixed member for rotatably supporting said tank relative to said fixed member, said torsion bar being twisted in proportion with the quantity of said liquid in said tank;

(c) limit means for limiting the degree of twist of said torsion bar to a predetermined angle when the liquid quantity in said tank attains a predetermined quantity which is between the maximum and the minimum liquid quantity of said tank;

(d) first electric member supported in fixed relation with said tank;

(e) second electric member supported in fixed relation with said fixed member and arranged to face said first electric member, said second electric member further being adapted to face the center of said first electric member whenever said torsion bar is not twisted.

(f) oscillation means for applying an oscillation signal to said first electric member at a predetermined frequency wherein said oscillation signal is coupled to said second electric member trough said first electric member; and (g) processing means, connected to said second electric member, for detecting the liquid quantity in said tank in response to the positional deviation of said second electric member from the center of said first electric member as represented by the degree to which said oscillation signal is coupled to said second electronic member through said first electric member.

* * * * *

UNITED STATES PATENT AND TRADEMARK OFFICE
CERTIFICATE OF CORRECTION

PATENT NO. : 4,512,189
DATED : April 23, 1985
INVENTOR(S) : J. KITAGAWA et al

It is certified that error appears in the above—identified patent and that said Letters Patent is hereby corrected as shown below:

In claim 3, column 8, line 22, "torson" should read

--torsion--.

Signed and Sealed this

Twenty-second Day of October 1985

[SEAL]

Attest:

DONALD J. QUIGG

Attesting Officer

Commissioner of Patents and
Trademarks—Designate